United States Patent [19]

Guillet et al.

[11] Patent Number: 4,883,857
[45] Date of Patent: Nov. 28, 1989

[54] PRODUCTION OF PHOTODEGRADABLE POLYESTER PLASTICS

[75] Inventors: James E. Guillet, Don Mills; Ilse Treurnicht; Ruey S. Li, both of Toronto, all of Canada

[73] Assignee: Ecoplastics Limited, Ontario, Canada

[21] Appl. No.: 252,799

[22] Filed: Sep. 30, 1988

[30] Foreign Application Priority Data

Sep. 30, 1987 [CA] Canada .................................. 550526

[51] Int. Cl.⁴ ............................................ C08G 63/02
[52] U.S. Cl. .................................... 528/272; 528/302; 528/304; 528/308.2; 528/220; 523/125
[58] Field of Search ............ 528/272, 302, 304, 308.2, 528/220; 523/125

[56] References Cited

U.S. PATENT DOCUMENTS 3,878,169  4/1975  Guillet et al. ....................... 528/220
4,042,568  8/1977  Guillet et al. ....................... 528/229
4,145,516  3/1979  Guillet et al. ....................... 528/85

Primary Examiner—John Kight
Assistant Examiner—S. A. Acquah
Attorney, Agent, or Firm—Nixon & Vanderhye

[57] ABSTRACT

Condensation copolymers such as polyesters are rendered photodegradable, by subjecting them to conditions under which they undergo ester interchange effectively causing polymer chain scission, in the presence of a keto carbonyl containing compound having chemical groups reactive with the condensation polymer products formed by the ester interchange. The compound reacts chemically with the polymer products to reform the high molecular weight condensation copolymer, but with the keto carbonyl groups chemically linked into the polymer chains to confer photodegradability thereon.

19 Claims, 1 Drawing Sheet

PRODUCTION OF PHOTODEGRADABLE POLYESTER PLASTICS

FIELD OF THE INVENTION

This invention relates to photodegradable plastics materials and processes for their preparation. More particularly, it relates to high molecular weight condensation polymers which will degrade upon exposure to ultraviolet radiation, e.g. direct sunlight, and processes for the preparation of such condensation polymers.

BACKGROUND AND PRIOR ART

It is known that the incorporation of ketone carbonyl groups into a polymeric backbone can render polymers photodegradable upon exposure to ultraviolet radiation. The keto carbonyl groups can be located in the polymeric backbone chains, or in a side chain adjacent to the main polymeric backbone chain. For example, U.S. Pat. No. 4,042,568 Guillet et al. discloses condensation polymers such as polyamides, polyesters, polyurethanes, polyepoxides, polyamide esters, polyurethanes and polyamino acids, which are photodegradable on exposure to U.V. light, due to the presence in the copolymer backbone of keto carbonyl groups located in side chains adjacent to the main chain of the copolymer backbone, in small amounts.

Condensation polymers such as polyesters have recently assumed an increased measure of commercial importance as disposable containers, e.g. for beverages, where they have received food grade approval for use in containers for soft drinks, beer, etc. As the volume of usage of such polyester containers increases, they become cheap, disposable, throw away items and pose a potential litter and environmental pollution problem. Such problems could be alleviated by making the containers of U.V. photodegradable polymers, so that they would degrade and effectively disappear eventually, if discarded in an outdoor environment where they would encounter incident direct and indirect sunlight. This would be particularly beneficial in remote rural areas, where collection of litter is uneconomic. Materials such as those described and exemplified in U.S. Pat. No. 4,042,568 are satisfactorily U.V. degradable, and fulfill most of the requirements in this regard. They are, however, relatively expensive, since they are prepared by polymerization of special keto-containing condensable monomers. If photodegradable condensation polymers are to complete successfully with regular condensation polymers in high volume, disposable food and beverage packaging applications, they must be price competitive therewith.

SUMMARY OF THE INVENTION

The present invention provides, from one aspect, a novel process for preparing U.V. photodegradable condensation polymers containing keto carbonyl groups, either in the backbone polymeric chain or in a side group adjacent to the backbone polymeric chain, in which a preformed high molecular weight thermoplastic condensation polymer is subjected to thermal treatment effectively causing polymer chain scission thereof, in the presence of a keto carbonyl group containing compound, containing at least two chemical groups reactive with the condensation polymer products so formed, the thermal treatment being conducted under conditions such that said compound joins to two or more such polymer products, and without serious deleterious side effects to the polymer. The effective result is that the keto carbonyl group containing compound inserts itself into the condensation polymer chain, to produce a U.V. photodegradable polymer of high molecular weight.

From another aspect, the present invention provides novel keto carbonyl group containing compounds, having at least two condensable groups per molecule, and capable of condensation reaction with polymeric fragments produced by catalytic thermal treatment of a condensation polymer, to insert themselves into a condensation polymer chain.

Thus the present invention allows one to effect chemical modification to a high molecular weight condensation copolymer, to introduce the property of U.V. photodegradability into it. Such condensation copolymers, e.g. polyesters, are readily available, inexpensive commodity items. Compounds containing keto carbonyl groups for incorporation therein can be prepared in straightforward economic manner. The process of compounding the polymer and incorporating the keto compounds therein can be simply and economically performed, e.g. in an extruder. This also may be accomplished as the polymer is molded into the desired finished article. Accordingly, the present invention provides relatively cheap, easily produced U.V. photodegradable condensation polymers, capable of economic use in disposable commodity items such as beverage bottles, wrapping films, containers and the like.

The U.V. photodegradable polymeric materials of the present invention may be used directly for the manufacture of finished thermoplastic articles therefrom. In the alternative, they may be used as masterbatches, and blended in appropriate proportions with standard condensation copolymers, to form a polymeric composition which is wholly U.V. photodegradable. The rate of photodegradation is largely determined by the molar concentration of keto carbonyl groups in the polymer or polymeric composition. Accordingly, when the keto carbonyl containing polymers of the present invention are to be used as masterbatch materials, they should contain a higher concentration of carbonyl than otherwise. Satisfactory rates of U.V. photodegradation are achieved with carbonyl concentrations in the polymer or polymeric blend of from 0.1–5 mole percent, preferably 0.5–3 mole percent.

The invention can be applied to substantially any condensation copolymer which effectively exists in equilibrium with its monomeric components, such as polyesters, polyamides, polyurethanes, polyepoxides, polyamide esters, polyureas and polyamino acids. The condensation copolymer must be capable of chain scission upon heating, in the substantial absence of oxygen. The keto carbonyl group containing compound should be chosen in conjunction with the condensation copolymer so that it consists essentially of a compound or monomer of the type from which the condensation copolymer is derived. Thus in the case of polyesters, the compound should be a keto carbonyl group containing hydroxyl compound or acid, preferably a hydroxy-acid. In the case of polyamides, it should be an amine or acid, preferably an amino acid.

DESCRIPTION OF THE PREFERRED EMBODIMENTS

Figure 1:
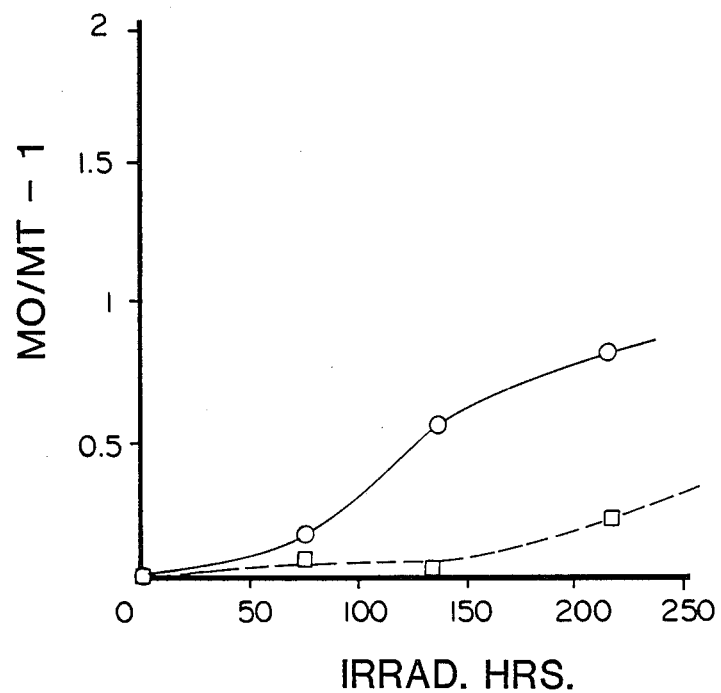

Most preferred among the condensation polymers are polyesters, on account of their ease of undergoing ester interchange, and so the invention will be further described and illustrated with specific reference to polyesters, especially polyethylene terephthalate, although it is not to be construed as limited thereto.

The common polyethylene terephthalate (PET) is a polyester condensation product derived from terephthalic acid or esters thereof and ethylene glycol. Commonly, the starting material is dimethyl terephthalate, of formula:

  (I)

and ethylene glycol. On heating with a suitable catalyst, each methyl ester group of terephthalic dimethyl ester DMT condenses with a hydroxyl group of ethylene glycol, releasing methanol and forming the condensation polymer. Two repeating units of polyethylene terephthalate PET can thus be illustrated as follows:

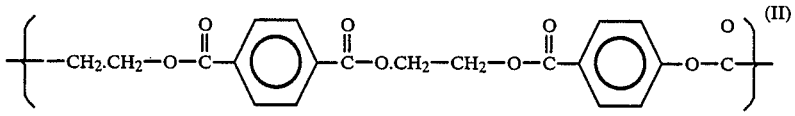  (II)

However, this condensation copolymerization reaction is, in fact, an equilibrium between the monomers and the condensation polymer. Upon heating, normally in the presence of a suitable catalyst, such as antimony trioxide or an organic acid, ester interchange takes place at the ester groups, thus incorporating the monomers into the polymer. The heating may cause melting of the polymer, or stop short of the melting point. Whilst the mechanism and resulting chemical groupings are not fully elucidated and understood, it appears that groups readily reactable with hydroxyl groups and groups readily reactable with acid groups are formed as end groups on the polymeric fragments so produced, i.e. effectively forming an acid-terminated fraction and a hydroxyl-terminated fraction. According to the invention, therefore, in its preferred embodiments, such ester interchange by heating is undertaken in the presence of material containing a reactive hydroxyl group and a reactive acid or acid functional derivative group, and which also contains in its structure a keto carbonyl group, either in linear relationship to the acidic and hydroxyl groups of the compound, or in a position adjacent to the linearly arranged claims terminated by the acidic or hydroxyl groups. As a result, at least some of the keto carbonyl containing compounds form links between the polymeric chain fragments so produced to reform the high molecular weight polyester chains, but with keto carbonyl groups located therein, to effect photodegradability on exposure to U.V. radiation on the resulting polymers.

The keto carbonyl containing compounds can be represented by the following general formula (III):

X—M—A—Q—Y    (III)

in which M and Q are independently selected from alkylene and aralkylene, optionally being interrupted by an acyl group

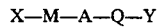

the alkylene portion thereof having from 2–10 carbon atoms;

A represents a keto carbonyl group of formula

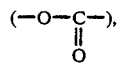

in which:
R is hydrogen, lower alkyl or lower alkaryl, and R' is lower alkyl or lower alkaryl;
and X and Y are independently selected from carboxyl, lower alkyl carboxylic ester, phenyl carboxylic acid ester, lower alkaryl carboxylic acid ester, haloacyl and hydroxy, one but not both of X and Y being hydroxy.

Fragments of the polyester produced on thermal treatment either recombine with one another to reform the starting material, or recombine with the compound of formula (III) as a linking compound. The molecular weight of the compound of formula (III) thus inserted into the polymeric chain is insignificant in comparison with the high molecular weight of the thermoplastic polyester starting material. Compounds of the formula (III) having groups M and Q similar to or the same as those to be found in the high molecular weight polyester are also preferred, so as to minimize the risk of undesired modification of other properties of the final thermoplastic polymer.

Compounds of formula (III) in which M is an alkylene chain interrupted by acyl, and X and Y are as defined above, are novel, and constitute a feature of the present invention. They may be prepared by transesterification methods, e.g. by reaction of a keto containing diacid of diester with a diol such as ethylene glycol, to form a keto containing diol, followed by reaction with a diester. Keto substituted dicarboxylic acids and esters for use as starting materials are known. When these are reacted with ethylene glycol in the presence of suitable catalysts such as zinc and calcium acetates, transesterification occurs to form keto substituted diol compounds, according to the following general reaction scheme:

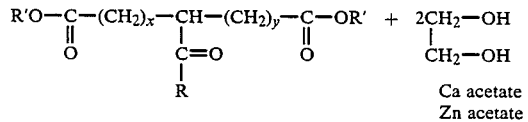

-continued

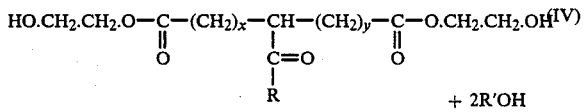
+ 2R'OH where R' is independently selected from hydrogen and lower alkyl.

In the above formulae, x and y are independently selected integers from 1–10. When, in the above scheme, x is 1, y is 1, R is methyl and R' is hydrogen, the starting diacid is β-acetylglutaric acid, a known compound. Other analogous keto-substituted diacids are known and can be used, for example γ-acetyl pimelic acid, γ-benz- oyl pimelic acid, γ-acetyl suberic acid, γ-acetyl azelaic acid and the like, and functional derivatives thereof which behave as acids, such as esters, acyl halides, anhydrides, etc. They are described in aforementioned U.S. Pat. No. 4,042,568 Guillet et al. Processes for their preparation are also known, for example from U.S. Pat. No. 2,438,961 Boese, and from U.S. Pat. No. 2,342,606 Bruson.

When group A in the compound of formula (III) is to be a keto group C=O, to provide backbone keto carbonyl containing polyesters, the diacid starting material contains a keto group in its backbone, instead of in a side chain, but the preparation of a compound similar to compound (IV) proceeds analogously to the transesterification shown above. An example of a known such diacid is γ-ketopimelic acid.

As noted, it is within the scope of the invention, although not preferred, to prepare compounds of formula (III) starting from keto-containing glycols, and regular, unsubstituted diacids such as glutaric acid, pimelic acid, suberic acid, succinic acid and the like. Keto-containing glycols are known, for example from aforementioned U.S. Pat. No. 4,042,568. Examples include γ-acetylpentamethylene-α, ω-glycol and γ-acetylhexamethylene-α, ω-glycol. Compounds analogous to those of formula IV can thus be formed, but in which the acyl groups are effectively "reversed" with respect to the keto carbonyl groups.

Then, to form the compound of formula (III), ready for reaction to insert into the polyester, the diol compound such as compound (IV) is reacted with a diacid or diester, under conditions controlled to effect ester interchange at one chain end only of the compound of formula (IV). When the polyester to be modified is polyethylene terephthalate, this diacid or diester is preferably dimethyl phthalate, a commercially available compound, so as to provide in the compound of formula (III) chemical groups M and Q substantially identical with those in polyethylene terephthalate. Thus the reaction can be represented as follows:

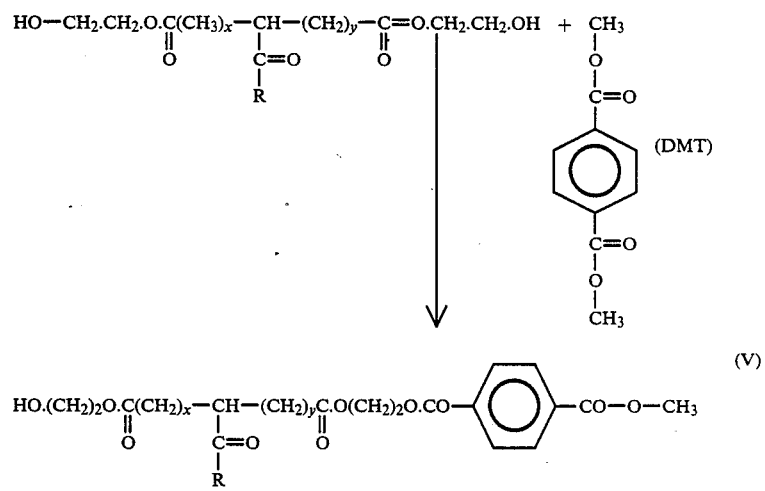

This compound of formula (V) can now be reacted with polyethylene terephthalate, by subjecting the polyethylene terephthalate to ester interchange in the presence of compound (V), and compound (V) will effectively insert itself into the polymer chains of polyethylene terephthalate, to impart U.V. degradability thereto.

In the alternative to the use of keto carbonyl containing compounds of formula III, one can use keto group containing low molecular weight condensation copolymers (oligomers) which upon thermal treatment will undergo chain scission reaction to yield keto group containing fragments. These fragments each have end groups capable of reaction with the polyester fragments resulting from the thermal chain scission of the high molecular weight polyester. Consequently thermal treatment of a mixture of polyester and oligomeric keto containing polyester results in ester interchange reactions between the fragments of the two starting materials, with random insertion of keto group containing fragments into the high molecular weight polyester. A photodegradable high molecular weight polyester results.

An example of such an oligomer is that produced by condensation copolymerization of keto pimelate with a glycol such as ethylene glycol. Such an oligomer contains a high concentration of keto groups, and will produce a relatively large number of keto group containing fragments for random insertion into polyethylene terephthalate for example.

The conditions under which the polyester is reacted with the keto carbonyl containing monomer should be such as to avoid substantial side reaction and oxidation of the high molecular weight polymer. Thus, the reaction should be conducted on the polymer in the molten state, in the substantial absence of oxygen, and preferably under conditions in which the reaction mixture can be vented so as to remove low molecular weight molecules produced in the condensation reaction. Subjecting the polymer to mixing in the molten state in an extruder, from which air is excluded, is satifactory. It may be necessary to have a catalyst present, to effect satisfactory chain scission of the polyester. Suitable catalysts include those which effect ester interchange in polyethylene terephthalate and polybutylene terephthalate production. A discussion of such catalysts, and a listing of representative examples, is to be found in "Encyclopedia of Polymer Science and Technology" Kirk-Othmer, Vol. II, pages 111-112, and in *J. Polymer Sci.*, 54, 385–410 (1961), R. E. Wilfong. Suitable among such catalysts is antimony trioxide. Indeed, commercially available polyethylene terephthalate commonly contains sufficient amounts of a catalyst for use in the present invention without addition of separate quantities of catalyst.

The most preferred way of conducting the process of the present invention is by formation of the keto-containing monomer of formula (III) in situ in the presence of the polyester into which the monomer is to be inserted, and under conditions which will permit such insertion as the monomer of formula III is formed. In this way, a most economical, one step process can be utilized. Thus there is prepared a mixture of the polyester, and the ingredients required to react to form the monomer of formula (III), namely a diol and a diacid, diester, diacylhalide, etc., one of which contains the keto carbonyl group. There is no need to recover the compound of formula (III) before it is mixed with the polyester. In this manner of proceeding, however, substantially equimolar quantities of ingredients forming the compound of formula (III) should be used. If there is a molar excess of either the diol or the diacid etc., there is a risk that this excess will react with polymer fragments of the polyester formed in the transesterification process to effect chain termination thereof. This will undesirably affect the molecular weight of the resultant polyester.

In this preferred way of operating, it is thus simply necessary to mix the polyester, diol and diacid or the like, optionally in the presence of added catalyst, and subject the mixture to high temperatures (e.g. 220°–280° C.) with adequate protection from oxidation and with facilities to allow removal of low molecular weight condensation reaction products (normally water or lower alcohols). Such conditions are to be found in conventional plastics extruders and solid state reactors. Thus, to conduct the preferred process of the invention, when operating above or below the melting point of the polyester, one merely mixes the materials in an extruder or solid state reactor, and obtains the modified, photodegradable polyester from the extruder, without in fact having to include any significant additional processing step or equipment into a regular plastics processing operation. Solid state reactors commonly operate at temperatures from about 5° C. to about 40° C. below the polymer melting point, and either under vacuum or under flush of nitrogen, for substantial exclusion of oxygen. The process is thus extremely economically conducted.

When a keto group containing oligomeric polyester is used for ester interchange, the reaction may also be conducted under extruder conditions as previously described. The oligomers are normally semisolid, paste-like materials, so that they are readily compounded with the high molecular weight polyester in the extruder barrel. Alternatively, however, some or all of the ester interchange reaction may take place in the solid state after the mixture has issued from the extruder. When operating in this manner, the oligomer is compounded with the high molecular weight polyester in an extruder, and the mixture is extruded therefrom in pellet form. Then the pellets are maintained at a temperature just below the melting point of the polyester for several hours, to drive the reaction to completion. Very high molecular weight polyesters containing keto carbonyl groups are produced in this way.

The preformed polyester which is modified according to the present invention may be newly manufactured, virgin resin, or previously used, recycle polyester resin. The invention in fact provides a means by which scrap polyester resin may be recycled and reused. At present, disposal of scrap polyester resin is a significant economic problem. The present invention allows scrap polyester to be converted to photodegradable form, re-used as a plastic (although perhaps not in food packaging applications) and will subsequently be more readily disposable on account of its photodegradability.

The products of the present invention, photodegradable condensation polymers, may be used in substantially any application where the corresponding non-photodegradable condensation polymers have previously been used. Beads or the like obtained from the extruder or solid state reactor as described above may be reprocessed to yield desirable products. The degree of homogeneity of the product is further improved as a result of such reprocessing. The physical and chemical properties of the final products remain substantially unaltered, other than the addition of the property of photodegradability.

The invention is further illustrated in the following specific examples.

EXAMPLE 1

Preparation of the diglycol ester of 2-acetyl-glutaric acid (DGAG)

DGAG was synthesized by transesterification of the diethyl ester of 2-acetyl glutaric acid (an acid with a ketone group in a side chain) with ethylene glycol in the presence of zinc and calcium acetates.

0.006 g calcium acetate and 0.003 g zinc acetate were dissolved in 4.66 g ethylene glycol (0.075M) in a glass tube (2.5 cm OD×20 cm ht). The solution was heated with 6.9 g diethyl 2-acetyl glutarate (0.03M) in an aluminum heating block which had a cavity sized to accommodate the glass tube. The contents were heated at 180°–200° C. for 2 hours. 2.8 g of a colourless condensate boiling at about 80° C. was collected. A slightly yellowish brown liquid residue was obtained in the glass tube after reaction. This residue was extracted with methylene chloride and water, and the two phases allowed to separate. Unreacted glycol was contained in the aqueous phase. The ester in the methylene chloride phase was purified with activated charcoal and recovered. An approximately 80% yield of ester was obtained.

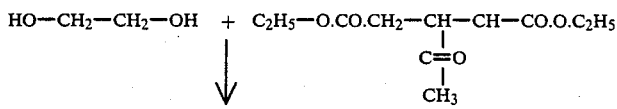

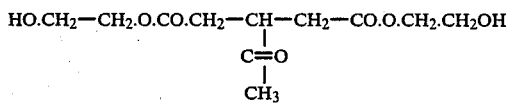

EXAMPLE 2

Insertion into polyethylene terephthalate of DGAG and dimethyl terephthalate 0.009 of antimony trioxide was mixed with 0.7 g of DGAG and 0.49 g dimethyl terephthalate (1:1 mole ratio). The mixture was added to 21.7 g pulverized commercial bottle grade polyethylene terephthalate resin and placed in a glass tube, lined inside with aluminum foil, as mentioned in example 1. The contents and aluminum foil were then heated, in the glass tube, under a high vacuum (30–300 microns) at 250°–280° C. for 2 hours in an aluminum block heater. After cooling to room temperature, the vacuum was released, and the aluminum foil tube containing the product was removed. The slightly grayish product in the aluminum tube was dissolved with trifluoroacetic acid—methylene chloride mixture (1:3) and a film was cast on Tedlar film. The film was then extracted (Soxhlet) overnight with methanol.

After drying, the film was aged in the Weather-Ometer. The intrinsic viscosities of the aged films along with PET films as controls were determined using a standard viscosity measurement technique. The molecular weights were calculated from the intrinsic viscosity, using the Mark-Houwink equation, with k value of 0.0021 and alpha value of 0.58. The rate of photodegradation was illustrated on a graph, FIG. 1, where there was plotted as ordinate the value $M_O/M_T - 1$, in which $M_O$ is the molecular weight of the initial resin, $M_T$ is its molecular weight after time T of exposure to ultraviolet radiation in the Weather-Ometer. When this ratio $M_O/M_T$ is unity, no reduction in molecular weight, i.e. no polymer chain scission has occurred. When this ratio is two, the molecular weight has halved, i.e. an average one break per polymer chain has occurred. The value of $M_O/M_T$ less one, as plotted, is thus proportional to the average number of chain scissions per polymer molecule. Accelerated degradation of the product of this example, compared with an unmodified polyethylene terephthalic acid, was thus demonstrated.

On FIG. 1, the circles and continuous curve are derived from the product of this example. The square plots and broken line curve are derived from similar testing of the unmodified polyethylene terephthalate resin.

EXAMPLE 3

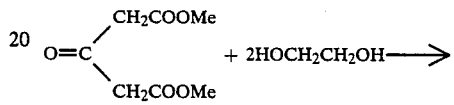

DGAG

Preparation of the diglycol ester of acetone dicarboxylic acid (DGAD)

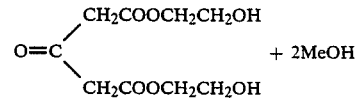

Calcium acetate (0.006 g) and zinc acetate (0.003 g) were dissolved in ethylene glycol (4.66 g, 0.075M) in a glass tube. The dimethyl ester of acetone dicarboxylic acid (5.25 g, 0.03M) was added and the reaction mixture heated in an aluminum heating block at 160°–185° C. for 2.5 hrs. Approximately 4 ml of condensate was collected at a vapour temperature of about 60° C. A slightly yellowish liquid product was obtained in the tube. The crude product was purified by dissolution in water (10 ml) followed by extraction with hexanes (2×25 ml). The hexane extracts were discarded. The aqueous layer was further extracted with methylene chloride (2×30 ml). The combined methylene chloride extracts were passed through a charcoal column to give an almost colourless solution. After evaporation of the solvent, the purified product was obtained as a thick oil in 80% yield.

EXAMPLE 4

Insertion of DGAD into polyethylene terephthalate

The diglycolester of acetone dicarboxylic acid (DGAD, 0.65 g) was mixed with an equimolar amount (based on DGAD) of dimethyl terephthalate (0.49 g). Pulverised commercial bottle grade polyethylene terephthalate (21.7 g) was added to the reaction mixture, which was in turn transferred to a glass tube lined with aluminum foil. The reaction vessel was heated in the cavity of an aluminum block heater at 260°–280° C. for 2 hours, under a vacuum of 100–300 microns. After cooling to room temperature, the vacuum was released. The fused product was dissolved in trifluoroacetic acid-methylene chloride mixture (1:3) and a film was cast on a glass plate. The dried film was extracted overnight with boiling methanol in a soxhlet extractor.

Figure 2:
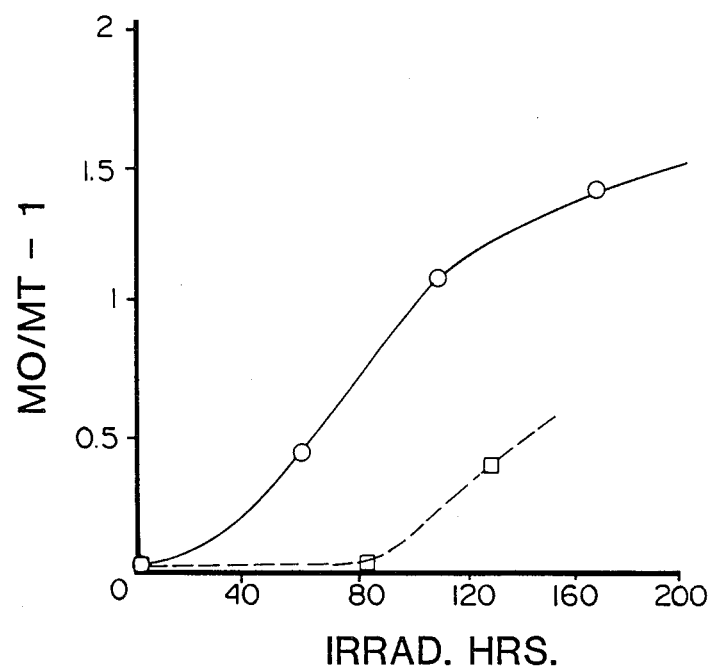

Photodegradation of the film was studied as described in Example 2, and the results are presented graphically on FIG. 2 in the same format and with the same notations. Accelerated photodegradation as compared with the unmodified polyethylene terephthalate resin is clearly demonstrated.

Similar results were obtained in the presence of antimony trioxide (0.009 g) catalyst.

EXAMPLE 5

Preparation of the diglycol ester of 4-acetylpimelic acid (DGAP)

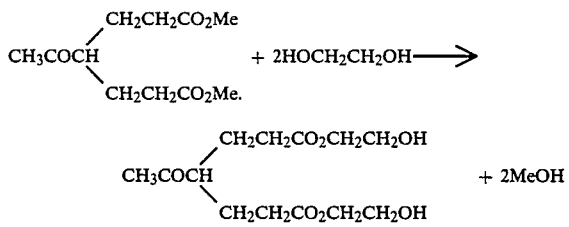

Calcium acetate (0.006 g) and zinc acetate (0.003 g) were dissolved in ethylene glycol (4.66 g, 0.075M). The dimethyl ester of 4-acetylpimelic acid (6.9 g, 0.03M) was added and the mixture was heated in an aluminum heating block at 180°–200° C. for 2.5 hours. Approximately 1 ml of condensate boiling at about 60° C. was collected, with an orange coloured liquid product remaining in the tube. The crude product was purified by dissolution in water (10 ml) followed by extraction with hexane (25 ml×2). The hexane solutions were discarded and the aqueous layer was extracted with methylene chloride (30 ml×2). The organic extracts were combined and passed through a charcoal column. Subsequent evaporation of the eluents gave an almost colourless liquid (DGAP) in 81% yield.

EXAMPLE 6

Insertion of DGAP into polyethylene terephthalate

Antimony trioxide (0.009 g) was dispersed in the diglycolester of 4-acetylpimelic acid (DGAP, 0.65 g). To this was added an equimolar amount (based on DGAP) dimethyl terephthalate (0.49 g), followed by pulverised commercial bottle grade polyethylene glass tube lined with aluminum foil and heated in the cavity of an aluminum block heater at 260°–280° C. for 2 hours, under a vacuum of 100–300 microns. After cooling to room temperature, the vacuum was released. The fused product was dissolved in trifluoroacetic acid-methylene chloride mixture (1:3) and a film was cast on a glass plate. The dried film was extracted overnight with boiling methanol in a soxhlet extractor.

Photodegradation of the film was studied as described in Example 2, and showed accelerated degradation when compared with untreated PET resin.

EXAMPLE 7

Insertion of the di(ethylene glycol) ester of 4-ketopimelic acid (DGKP) into polyethylene terephthalate using a reactive extrusion process A Betol BTS 40 twin screw extruder, with corotating screws of 40 mm diameter and a 21:1 L/D ratio, was used to conduct the insertion reaction of DGKP into molten polyethylene terephthalate.

The PET resin (Kodapak PET 9663 clear) was pre-dried overnight and mixed with antimony trioxide (0.04% by weight) and dimethyl terephthalate (2.25% by weight). The mixture was loaded into an AccuRate feeder, with feed rate set at 1 kg/hr. The temperature of the extruder barrel was kept in the range 220°–260° C.

DGKP was fed into the PET melt stream through a vent port at a rate controlled to yield a 3% by weight addition level. The extruded product filament was cooled in a water trough and pelletized.

The reaction product was thermally pressed into clear films and irradiated in the QUV Accelerated Weather Tester. The films failed at 92 hours, whereas the control PET resin film remained intact.

We claim:

1. A process for preparing condensation polymers having accelerated photodegradability and containing keto carbonyl groups, either in the backbone polymeric chain or in a side group adjacent to the backbone polymeric chain, which comprises subjecting a high molecular weight thermoplastic condensation polymer capable of chain scission upon heating, in the substantial absence of oxygen, to thermal treatment to cause polymer ester interchange reaction thereof and so to form condensation polymer products therefrom, in the presence of a keto carbonyl group containing compound containing at least two chemical groups reactive with the condensation polymer products so formed, the thermal treatment being conducted under conditions such that said compound chemically reacts with the condensation polymer products to re-form high molecular weight condensation polymer chains containing keto carbonyl groups.

2. The process of claim 1 wherein said condensation polymer is a polyester.

3. The process of claim 2 wherein said polyester is polyethylene terephthalate.

4. The process of claim 2 wherein the keto carbonyl group containing compound has a terminal hydroxy group and a terminal acid functional group.

5. The process of claim 4 wherein the keto carbonyl group containing compound has side chain keto carbonyl groups.

6. The process of claim 2 wherein said keto carbonyl group containing compound corresponds to the general formula $$X-M-A-Q-Y$$

in which

M and Q are independently selected from alkylene and aralkylene, optionally interrupted by an acyl group (—O—CO—), the alkylene portion thereof having from 2–10 carbon atoms;

A represents a keto carbonyl group of formula $$C=O \text{ or } R-C-CO-R'$$

in which

R is hydrogen, lower alkyl or lower alkaryl, and R' is lower alkyl or lower alkaryl;

and X and Y are independently selected from carboxyl, lower alkyl carboxylic ester, phenyl carboxylic ester, lower alkaryl carboxylic acid ester, haloacyl and hydroxy, one but not both of X and Y being hydroxy.

7. The process of claim 6 wherein x in said keto compound of general formula is hydroxy and y therein is lower alkyl ester.

8. The process of claim 6 wherein said keto carbonyl group containing compound is prepared by transesterification of a keto containing diacid or functional derivative with a diol, or by transesterification of a keto containing diol with a diacid or functional derivative thereof.

9. The process of claim 8 wherein transesterification is conducted using a keto containing diacid or functional derivative thereof and a diol.

10. The process of claim 9 wherein the diacid is selected from acetone dicarboxylic acid, 2-acetyl-glutaric acid, γ-acetyl pimelic acid, γ-benzoyl pimelic acid, γ-acetyl suberic acid and γ-acetyl azelaic acid.

11. The process of claim 8 wherein the transesterification reaction to produce the keto carbonyl group containing compound is conducted in the presence of the polyester.

12. The process of claim 11 wherein said transesterification is conducted under conditions causing polymer ester interchange reaction of the polyester.

13. The process of claim 12 wherein said conditions include temperatures sufficient to maintain the polyester in molten state, mechanical shearing and the substantial exclusion of oxygen.

14. The process of claim 13 conducted in an extruder.

15. The process of claim 12 wherein said conditions are solid state conditions in which the polyester is maintained at temperatures from about 5° C. to about 40° C. below the melting point thereof, under reduced pressure with substantial exclusion of oxygen.

16. The process of claim 14 wherein the polyester is previously utilized and molded scrap polyester.

17. The process of claim 2 wherein the polyester is reacted with a keto carbonyl group containing compound formed in situ by thermal treatment of a keto group containing oligomeric ester compound.

18. The process of claim 17 wherein the oligomeric ester is mixed with the polyester in an extruder.

19. The process of claim 18 wherein beads of polymeric mixture are recovered from the extruder and maintained at an elevated temperature but below the melting point of the polyester, to pursue the ester interchange reaction.

* * * * *